UNITED STATES PATENT OFFICE.

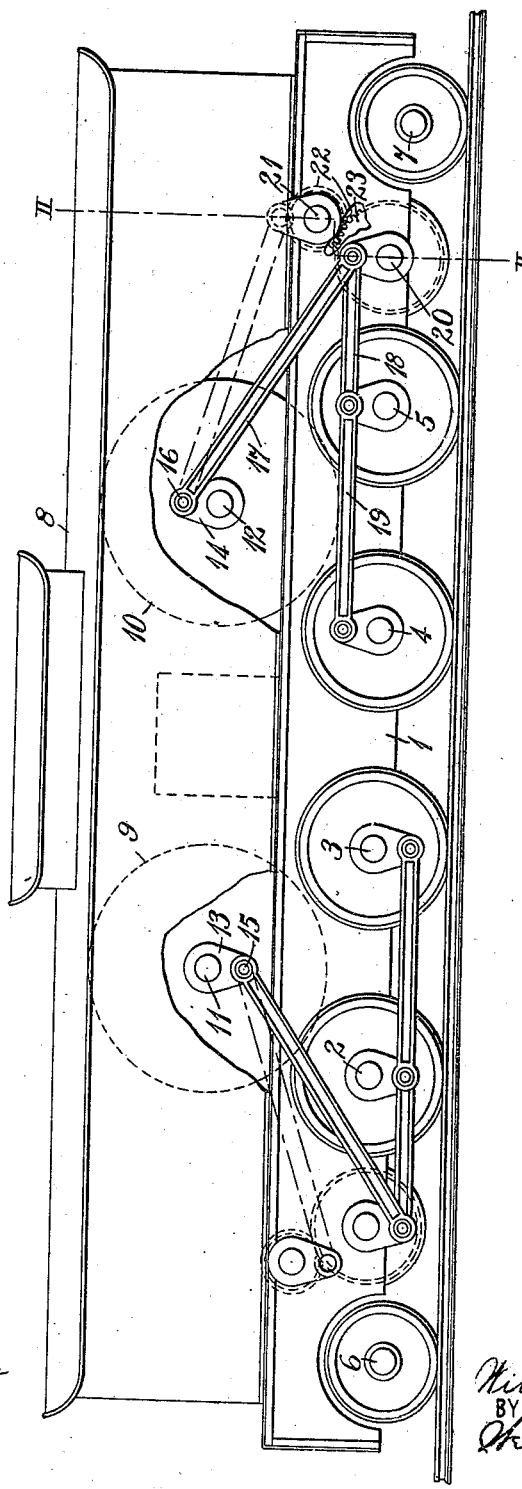

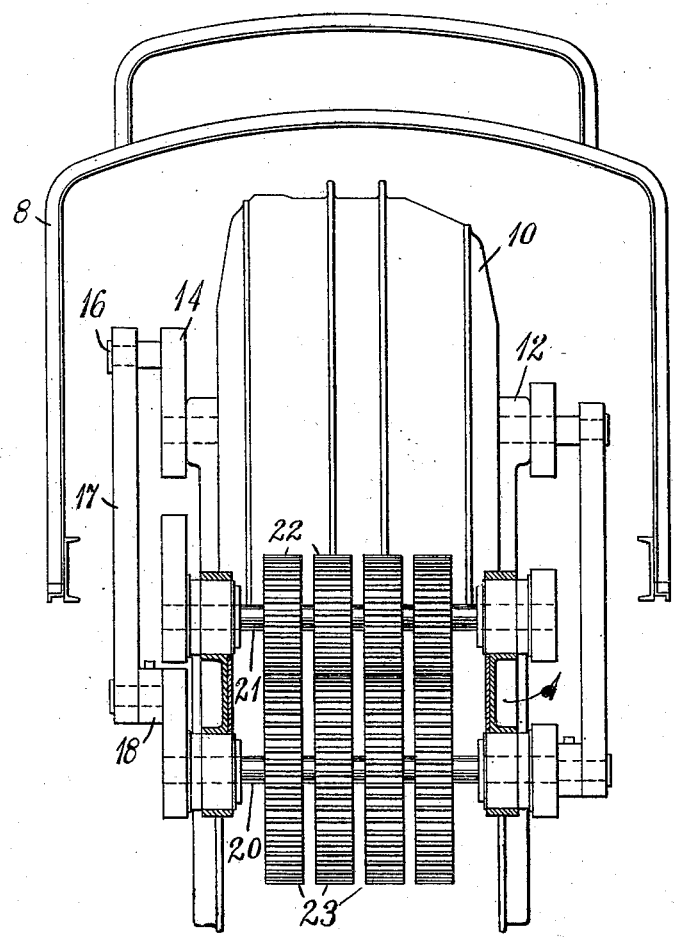

WILLIAM COOPER, OF PITTSBURG, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

990,958.     Specification of Letters Patent.     Patented May 2, 1911.

Application filed September 10, 1909. Serial No. 517,152.

*To all whom it may concern:*

Be it known that I, WILLIAM COOPER, a citizen of the United States, and a resident of Pittsburg, in the county of Allegheny and State of Pennsylvania, have invented a new and useful Improvement in Electric Locomotives, of which the following is a specification.

My invention relates to electrically propelled vehicles, and particularly to electric motor-driven locomotives for heavy railway service.

The object of my invention is to provide a simple and novel driving connection between the motors of an electric locomotive and the truck axles whereby the speed ratio between the motor axles and the driving axles may be changed to suit the conditions of operation.

When very large motors are used for driving an electric locomotive, they are usually mounted in the cab and are sometimes connected to the truck axles by means of side rods.

According to my present invention, I provide a jackshaft which is preferably located outside the rigid wheel base of the truck with which it is associated, a second jackshaft which is geared to the first, and side-rod connections between the motor axles and one of the jackshafts and between the jackshaft and the driving axles, the location of the two jackshafts being such that the connecting rods which are joined to the motor axle may be transferred from one to the other of the jackshafts, the gear ratio being such that two locomotive speeds may be obtained for a single motor speed.

Figure 1 of the accompanying drawings is a side elevation of a locomotive embodying my invention, a portion of the cab being broken away to disclose the driving connections between the motors and the axles. Fig. 2 is an end elevation of the locomotive shown in Fig. 1, the cab and the body frame being shown in transverse section.

Referring to the drawings, the locomotive here shown comprises a body frame 1, which is resiliently supported on a plurality of driving wheel-axles 2, 3, 4 and 5, and truck wheel-axles 6 and 7; a cab 8, electric driving motors 9 and 10, which are supported on the frame 1 and are located in the cab, and driving connections between the motors and the driving wheel-axles.

The shafts 11 and 12 of the motors 9 and 10 are provided with crank heads 13 and 14, from which crank pins 15 and 16 project outwardly.

The driving wheel-axles are divided into two groups, of which the axles 2 and 3 comprise one group and the axles 4 and 5 another. The motor 10 is operatively connected to the axles 4 and 5 by means of connecting rods 17, 18 and 19; a jackshaft 20 which is substantially parallel to the axles 2 and 3 and lies in the same horizontal plane at one side of them, being introduced in the driving connection between the motor-axles and the truck-axles.

The jackshaft 20 and the axles 4 and 5 are provided with crank heads and pins to which the rods 17, 18 and 19 are connected. A second jackshaft 21 is located above and slightly to one side of the jackshaft 20 and is connected to it by means of a gear connection comprising one or more sets of gears 22 and 23. The jackshaft 21 is at the same distance from the motor-axle 12 as the jackshaft 20 and is similarly provided with crank heads and pins so that the rod 17 may be connected to either the one or the other, thereby constituting a direct or indirect connection from the motor to the jackshaft 20 and the driving axles 4 and 5. The gear or gears 22 will ordinarily have less teeth than the gears 23 in order that the speed of the locomotive-axles may be reduced relative to the motor speed, by connecting the rod 17 to the jackshaft 21; the axle speed will, of course, correspond to the motor speed when the rod is connected to the jackshaft 20.

The driving connection between the motor 9 and the axles 2 and 3 corresponds to that already described between the motor 10 and the axles 4 and 5.

The arrangement shown has the advantage that the gears 22 and 23 may be made of relatively large size, thereby decreasing the wear, and that they may be located, as in Fig. 2 of the drawings, between the bearings in which the jackshafts are mounted. A single gear having a comparatively wide face may be substituted for the gears 22 and another gear substituted for the gears 23, depending upon the size of the driving-motors and the gear ratio which are found desirable.

When the connection is established from the motor-axles to the jackshaft 20, the jackshaft 21 and the gears 22 are driven by the gears 23 and operate without load, and, when the connection is made to the jackshaft 21, the gears 22 drive the gears 23 and the shaft 20, which, in turn, drives the axles 4 and 5.

It is not my object to provide a speed changing device in the ordinary sense, since devices of this character are not adapted for use with the powerful driving motors of electric locomotives, by reason of the large forces transmitted. I have, however, provided means by which a locomotive may be easily modified so as to enable it to operate economically at both high and low speeds. The locomotive may be divided into two articulated half units, and whether the locomotive is so divided or is arranged as shown in Fig. 1, the motor weights are equally distributed upon the two groups of truck-axles and the locomotive is well balanced.

I desire that variations in size and arrangement of parts which do not depart from the spirit of my invention shall be included within its scope.

I claim as my invention:

1. A railway vehicle comprising driving wheel axles, a driving motor, a jack shaft operatively connected to the wheel axles, connecting rods jointed to the motor shaft at one end and means whereby the opposite ends of the rods may be connected, either directly or indirectly, to the jack shaft and whereby the speed ratio between the motor shaft and the wheel axles may be changed.

2. In an electric locomotive, the combination with driving wheel axles, a jack shaft and a propelling motor, of a second jack shaft operatively connected to the first, an operative connection between one of the jack shafts and the driving wheel axles, and mean for establishing a connection between the propelling motor and either the one or the other of the jack shafts, whereby the speed ratio between the propelling motor and the driving wheel axles may be varied as desired.

3. In an electric locomotive, the combination with driving wheel-axles, a jackshaft and a propelling motor, of a second jackshaft geared to the first, an operative connection between one of the jackshafts and the driving wheel-axles, and means for establishing a connection between the propelling motor and either the one or the other of the jackshafts, whereby the speed ratios between the propelling motor and the driving wheel-axles may be varied as desired.

In testimony whereof, I have hereunto subscribed my name this 30th day of Aug., 1909.

WILLIAM COOPER.

Witnesses:
G. H. HARTSOUGH, Jr.,
B. B. HINES.

---

Copies of this patent may be obtained for five cents each, by addressing the "Commissioner of Patents, Washington, D. C."